United States Patent
Shearer

(10) Patent No.: US 7,839,263 B2
(45) Date of Patent: Nov. 23, 2010

(54) SYSTEM AND METHOD OF TRAINING IN A TRANSMIT/RECEIVE SYSTEM

(75) Inventor: Carl L. Shearer, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 878 days.

(21) Appl. No.: 10/539,663

(22) PCT Filed: Mar. 16, 2005

(86) PCT No.: PCT/US2005/008820

§ 371 (c)(1),
(2), (4) Date: Feb. 9, 2006

(87) PCT Pub. No.: WO2005/091240

PCT Pub. Date: Sep. 29, 2005

(65) Prior Publication Data

US 2006/0198523 A1    Sep. 7, 2006

Related U.S. Application Data

(60) Provisional application No. 60/553,409, filed on Mar. 16, 2004.

(51) Int. Cl.
*G05B 19/00* (2006.01)
*G08C 19/00* (2006.01)
*H04K 1/00* (2006.01)

(52) U.S. Cl. .................. 340/5.23; 340/5.64; 340/5.71; 340/825.69; 380/270

(58) Field of Classification Search ................. 340/5.23
See application file for complete search history.

(56) References Cited

U.S. PATENT DOCUMENTS

| | | | |
|---|---|---|---|
| 5,614,891 A | 3/1997 | Zeinstra et al. | |
| 5,661,804 A * | 8/1997 | Dykema et al. | ............. 380/274 |
| 5,686,903 A | 11/1997 | Duckworth et al. | |
| 5,686,904 A | 11/1997 | Bruwer | |
| 6,078,271 A | 6/2000 | Roddy et al. | |
| 6,486,795 B1 | 11/2002 | Sobel et al. | |
| 7,050,794 B2 * | 5/2006 | Chuey et al. | ................. 455/418 |
| 7,412,056 B2 * | 8/2008 | Farris et al. | ................. 380/262 |
| 2003/0016139 A1 * | 1/2003 | Teich | .................... 340/825.22 |
| 2003/0033540 A1 | 2/2003 | Fitzgibbon | |
| 2003/0189530 A1 | 10/2003 | Tsui | |
| 2003/0193448 A1 | 10/2003 | Tsui | |
| 2003/0216139 A1 * | 11/2003 | Olson et al. | ................. 455/419 |
| 2006/0217850 A1 * | 9/2006 | Geerlings et al. | ............. 701/2 |

OTHER PUBLICATIONS

Datasheet for HCS300, Keeloq® Code Hopping Encoder by Microchip Technology, Inc.; Copyright 2001, 28 pages.

* cited by examiner

*Primary Examiner*—Brian A Zimmerman
*Assistant Examiner*—Mark Rushing
(74) *Attorney, Agent, or Firm*—Foley & Lardner LLP

(57) ABSTRACT

A radio frequency transmitter is configured to send radio frequency messages to activate a remote system. Each message includes an encrypted counter value and a transmitter identifier. The transmitter is configured to send at least two of the messages having sequential encrypted counter values in response to a single user input.

20 Claims, 3 Drawing Sheets

SYSTEM AND METHOD OF TRAINING IN A TRANSMIT/RECEIVE SYSTEM

CROSS REFERENCE TO RELATED PATENT APPLICATION

This application claims the benefit of U.S. Provisional Application No. 60/553,409, filed Mar. 16, 2004.

BACKGROUND

Wireless transmit/receive systems are used in many different applications to provide a convenient method of remote control of devices. One such system is a transmit/receive system used to open the garage door of a user's home. This system includes a garage door opening system, a receiver coupled to the garage door opening system, and an original, hand-held transmitter. The user presses a button on the original transmitter to transmit a radio frequency signal to the receiver to activate the garage door opening system to open and close a garage door.

Garage door opener systems sold today commonly use encryption technology to encrypt the radio frequency signal sent from the transmitter to the receiver. This prevents "code grabbers" from stealing the digital message modulated on the radio frequency signal and using the digital message to gain access to the user's garage and, potentially, the home. One such encryption method is a rolling code system, wherein each digital message sent from the transmitter to the receiver has a different code from the last digital message.

In one such system, a transmitter identifier (sometimes called a serial number) and an encrypted counter value (sometimes called a hop code) are sent with each transmission. A counter value in the transmitter increments each time the transmitter button is pressed. An encryption algorithm encrypts the counter value to create a new encrypted code or value. When the encrypted counter value is transmitted, it appears to bear no predictable relationship to the previously sent encrypted counter value, and thereby appears to "hop" from one value to another. The receiver also stores the counter value in unencrypted form. Upon receipt of an encrypted counter value for a particular transmitter identifier, the counter value is unencrypted and compared to the previously stored counter value to determine whether the garage door opener should be activated. If the new value is less than or the same as the previously stored counter value, it may have come from a code grabber, and, therefore, the receiver does not activate the garage door opener. If the new value is greater than the previously stored counter value but less than a predefined number, the garage door is activated. If the new value is greater than the predefined number ahead of the previously stored counter value, the receiver stores the value, but does not activate the garage door opener. Upon receipt of the next counter value from the transmitter, if the receiver determines that the two values are in sequence, the garage door is activated and the most recently received counter value is stored in memory. Of course, this is just one example of many types of rolling code-based systems.

When training or programming a new transmitter to operate with a receiver, the two must be "synchronized" so that their counters begin at the same value. Also, the receiver must learn the transmitter identifier of the new transmitter. In a training mode, the user presses a button on the receiver to place the receiver in a training mode. The user then presses a button on the transmitter to send a first message including the transmitter identifier and counter value. The receiver stores this received information. The user then must press the button on the transmitter a second time to send another message including the transmitter identifier and the next counter value in sequence. Upon receipt of two counter values in sequence for a given transmitter identifier, the receiver becomes trained to the transmitter and stores the transmitter identifier and most recently received counter value, typically in non-volatile memory.

One drawback of this system is that a user who is training a new transmitter to the receiver often neglects to press the transmitter button twice to complete the training. As a result, the system does not train properly, and the user calls the manufacturer of the transmitter and/or receiver reporting a problem, when no problem in fact exists.

This problem also occurs when the transmitter is a universal transmitter for an automobile, such as the HomeLink® trainable transmitter manufactured by Johnson Controls Interiors LLC, Holland, Mich. The HomeLink® trainable transmitter is configurable by a user to activate one or more of a plurality of different receivers using different radio frequency messages. This trainable transmitter is "trained" to an existing original transmitter by holding the two transmitters in close range and pressing buttons on the original transmitter and trainable transmitter simultaneously. The trainable transmitter identifies the type of transmit/receive system associated with the transmitter based on the radio frequency signal received from the original transmitter. The user then presses a button on the receiver to put the receiver in a training mode. The last step in the training process for some remote control systems is to press a button on the trainable transmitter two to three times. The first two messages are sent to complete synchronization of the receiver, and the third message is sent to activate the garage door opener so that the user gets a visual confirmation that the training process was successful. However, many users fail to press the button on the trainable transmitter a sufficient number of times, causing the problems mentioned hereinabove.

Accordingly, what is needed is an improved system and method of synchronizing or training a transmitter to a receiver in a transmit/receive system using a counter value, such as a rolling-code type system. Further, what is needed is a system and method which will simplify the synchronizing or training process for a transmit/receive system and, in particular, simplify the process for training a trainable transmitter to a receiver. Further still, what is needed is a system and method which will reduce the time it takes to train a transmitter to a receiver in a rolling-code type system.

SUMMARY

According to one exemplary embodiment, a radio frequency transmitter is configured to send radio frequency messages to activate a remote system. Each message includes an encrypted counter value and a transmitter identifier. The transmitter is configured to send at least two of the messages having sequential encrypted counter values in response to a single user input.

According to another exemplary embodiment, a radio frequency remote control system comprises a transmitter configured to send at least two messages in response to one user input. The two messages are sequential transmissions of a rolling-code system. The system further comprises a receiver configured to synchronize with the transmitter based on the two messages.

According to another exemplary embodiment, a method of providing a counter value and a transmitter identifier to a receiver configured to control a system comprises receiving a single user input and, in response to the single user input, transmitting a plurality of sequential encrypted counter values to the receiver.

According to another exemplary embodiment, in a method of training a transmitter to a receiver in a rolling code-based radio frequency control system, the improvement comprises, in response to a single user input, transmitting at least two sequential counter values to the receiver.

DETAILED DESCRIPTION OF EXEMPLARY EMBODIMENTS

Figure 1:
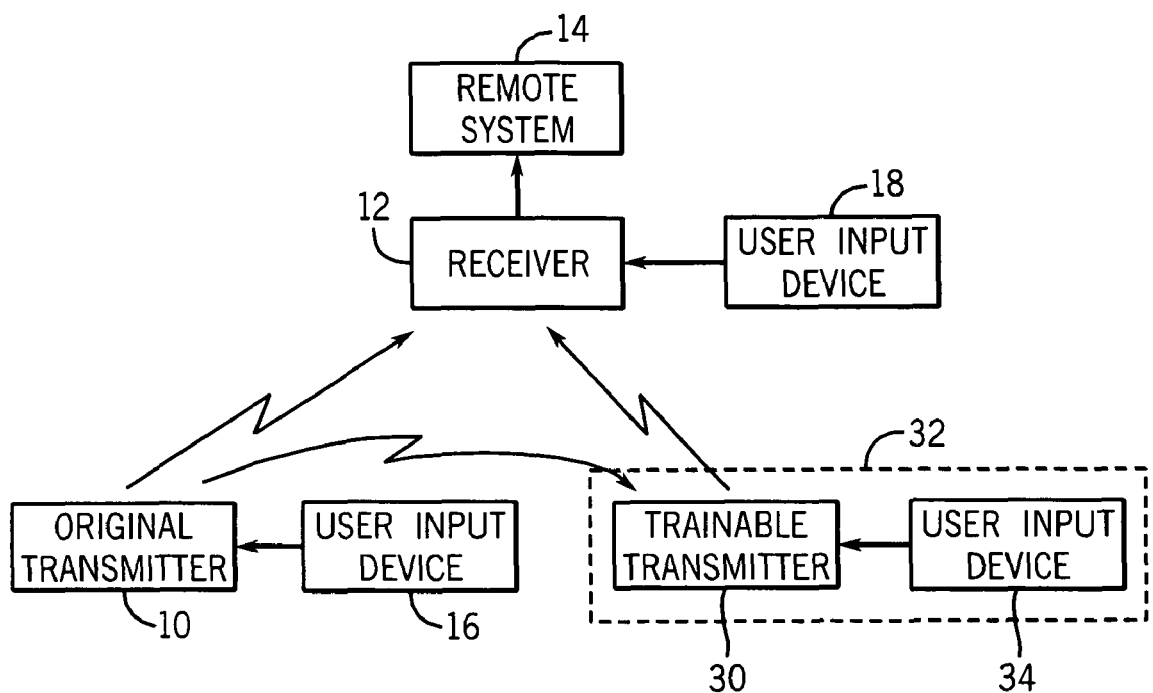
FIG. 1 is a block diagram of a transmit/receive system, according to ah exemplary embodiment.

Referring first to FIG. 1, a block diagram of a transmit/receive system is shown, according to an exemplary embodiment. A transmitter 10 and a receiver 12 are provided. Transmitter 10 is a radio frequency transmitter configured to send wireless, radio frequency messages to receiver 12 to activate a remote system 14 coupled to receiver 12. Remote system 14 can be a garage door opener, a gate opener or operator, a home alarm system, a home lighting system, a heating ventilation air conditioning (HVAC) system, a deadbolt doorlock or entry door lock system, a home appliance, a remote keyless entry (RKE) system for an automobile, or other security or access-controlled system for residential and/or commercial applications. Each radio frequency message transmitted by transmitter 10 to receiver 12 can be configured to activate remote system 14 via receiver 12 to cause remote system 14 to take some action, to synchronize, to arm or disarm a security system, to open a garage door or gate, to lock or unlock a deadbolt lock system, to lock or unlock a vehicle RKE system, to create a panic/alarm condition at a vehicle, or to cause some other function or effect.

Transmitter 10 and receiver 12 can include digital and/or analog circuitry to perform the functions recited herein and can include, for example, one or more microprocessors, microcontrollers, application-specific integrated circuits, volatile and/or non-volatile memories and radio frequency transmit and/or receive components, such as transistors, inductors, antennas, etc. Transmitter 10 and receiver 12 each include a user input device 16, 18, respectively, which can be a push button, switch, dial, touch-screen display, voice or speech-recognition system, or can even include a biometric scanning device for improved security (e.g., fingerprint scanner).

Transmitter 10 and receiver 12 communicate using encryption technology in this exemplary embodiment. For example, a Keeloq® encryption algorithm manufactured by Microchip Technology, Inc., Chandler, Ariz. can be used. See, for example, U.S. Pat. No. 5,686,904 and the HCS300 datasheet by Microchip Technology, Inc., copyright 2001. Alternatively, any of a variety of rolling-code or non-rolling code encryption algorithms may be used, including those implemented in remote keyless entry systems and garage door opener systems.

Figure 2:
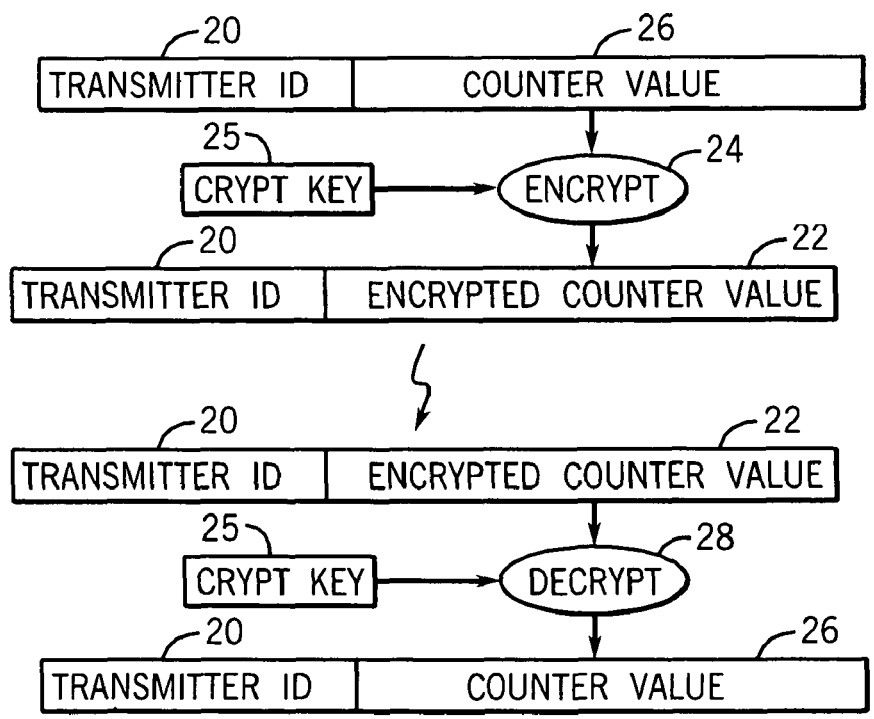
FIG. 2 is a schematic diagram of a digital message, according to an exemplary embodiment.

Referring now to FIG. 2, in one exemplary encryption method, each radio frequency message sent from transmitter 10 includes an identifier (ID) 20 and an encrypted counter value 22. Encrypted counter value 22 is derived from an encryption operation 24 performed on a counter value 26 using a crypt key 25. Counter value 26 is stored in memory in transmitter 10 and in receiver 12. Each time user input device 16 (FIG. 1) is actuated, counter value 26 increments (for example by 1, 3, or another fixed or predictable value), is encrypted and is concatenated to transmitter ID 20 and then sent to receiver 12. Receiver 12 receives transmitter ID 20, which is unencrypted in this exemplary embodiment and the encrypted counter value 22 and decrypts the encrypted counter value using a decryption operation 28 and the crypt key 25 to arrive at the counter value 26. The receiver then subtracts the decrypted counter value from a counter value previously stored in memory and associated with transmitter ID 20 to determine whether to activate remote system 14. In an alternative embodiment, transmitter ID 20 can be encrypted at transmitter 10 and decrypted at receiver 12. Receiver 12 can be configured to synchronize with multiple transmitters, each having its own transmitter ID.

Returning to FIG. 1, a trainable transmitter 30 is shown which can be optionally coupled to a vehicle interior element 32 or can be a hand-held device. Trainable transmitter 30 further comprises a user input device 34 coupled thereto. Vehicle interior element 32 can be a visor, overhead compartment, instrument panel, seat, center console, door panel, or any other vehicle interior element. Trainable transmitter 30 is trainable or configurable by a user to activate one or more of a plurality of different remote systems 14 using different radio frequency messages. In one exemplary embodiment, trainable transmitter 30 can be a HomeLink® trainable transmitter manufactured by Johnson Controls Interiors LLC, Holland, Mich. Trainable transmitter 30 can operate as shown in any of U.S. Pat. Nos. 5,686,903, 5,661,804, or 5,614,891, which are incorporated by reference herein.

Trainable transmitter 30 can be configured to activate or control remote systems using one or more different radio frequencies. For example, trainable transmitter 30 can be configured to control one garage door opener operating an encrypted, rolling-code algorithm, one garage door opener operating a fixed, non-encrypted algorithm (e.g. an 8-bit message selected using switches) and a deadbolt doorlock system which can lock and unlock a door of the user's home. Trainable transmitter 30 can be trained in any number of ways. For example, trainable transmitter 30 can be configured to scan a plurality of frequencies to identify the frequency of a signal transmitted by an original transmitter 10, to identify frequency and data code on transmitter 10, and to store the frequency and data code for subsequent retransmission. Alternatively, the user can use user input device 34 to select from a plurality of pre-stored algorithms (e.g. using a display and menu of options) for a remote system 14 to be controlled. Other methods of training or programming are contemplated, such as those shown in U.S. Pat. Nos. 6,078,271 and 6,486,795.

Trainable transmitter 30 can be a hand-held transmitter or can be integrated into a vehicle interior element such that it is not easily removable from the vehicle interior element. For purposes of this document only, a trainable transmitter 30 removably clipped onto a visor would not be "integrated into" a vehicle interior element, but one built-in to the visor would be "integrated into" a vehicle interior element.

Figure 3:
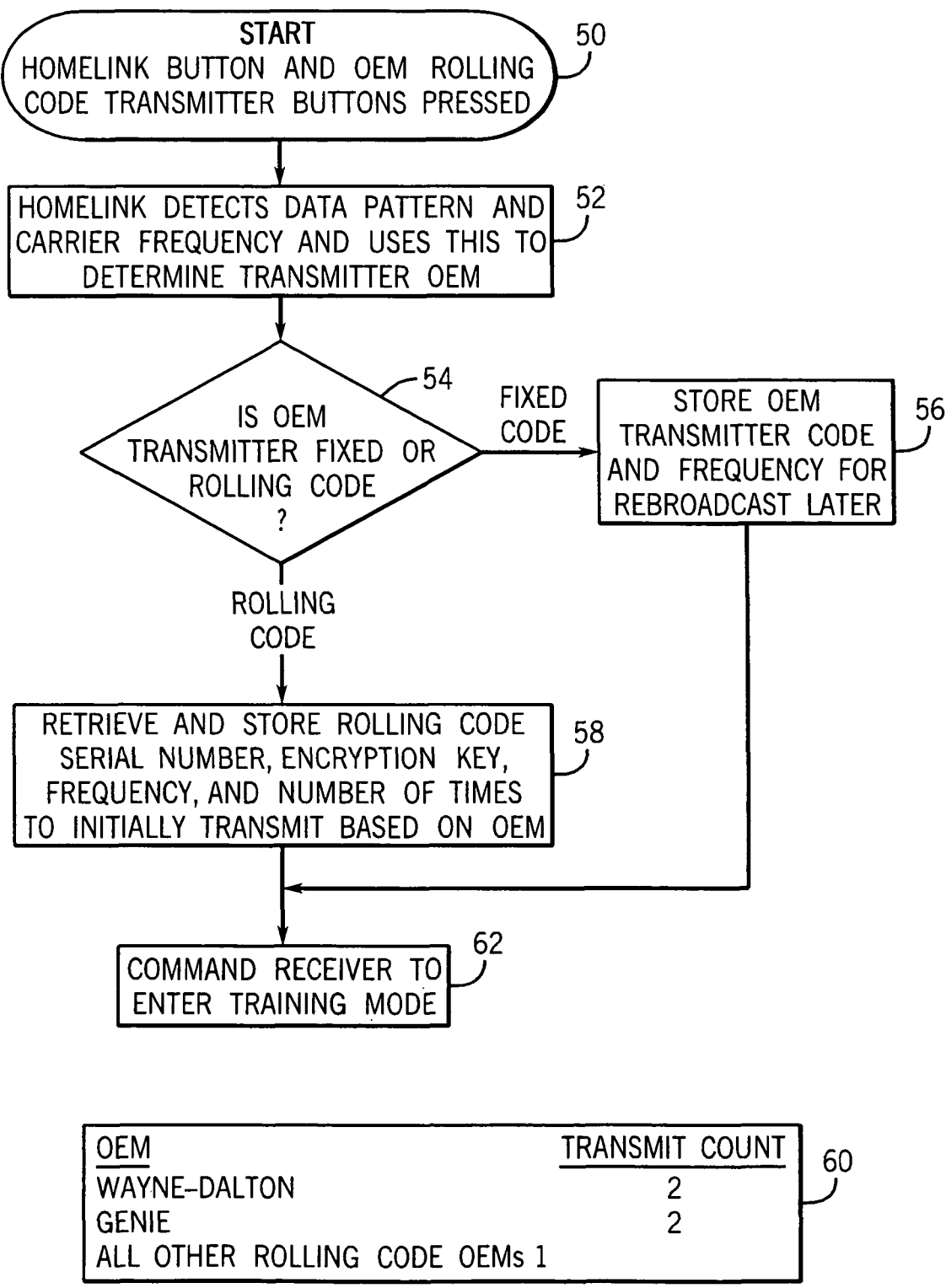
FIG. 3 is a flowchart of a training method, according to an exemplary embodiment.

Referring now to FIG. 3, a method of training trainable transmitter 30 is disclosed, according to an exemplary embodiment. At a step 50, user input device 34 and user input device 16 (FIG. 1) are activated simultaneously and original transmitter 10 and trainable transmitter 30 are brought within a close range of each other. At a step 52, trainable transmitter 30 identifies the type of receiver associated with original transmitter 10. According to one exemplary embodiment, the type of receiver is identified based on the radio frequency signal received from the original transmitter 10 which is associated with receiver 12. Trainable transmitter 30 detects the pattern of data in the radio frequency message sent by transmitter 10 and its carrier frequency and uses this information to determine the type of transmit/receive system 10, 12. At a step 54, if the transmitter is a fixed-code system, at a step 56, the fixed code and frequency are stored for later retransmission during an operating mode. If the radio frequency message is a rolling code message, at a step 58, a rolling code serial number or transmitter identifier, encryption key, frequency, and the number of times to initially transmit are retrieved from memory based at least in part on the type or manufacturer of transmit/receive system 10, 12. In some embodiments, these values may be generated using the data carried by the signal received from the original transmitter 10 and a mathematical formula. As shown at memory chart 60, in one exemplary embodiment, for a Wayne-Dalton® or Genie® garage door opener, a transmit counter is set to 2 and for all other rolling code remote system types, the transmit counter is set to 1. While the exemplary embodiment described above uses original transmitter 10 to train trainable transmitter 30, other systems may train trainable transmitter 30 without using original transmitter 10. For example, trainable transmitter may be trained by setting dip switches, by user control (e.g. using a display, such as a CD player display, to provide a menu through which a user can scroll) or by some other means.

At a step 62, the user commands receiver 12 to enter a training mode, for example by actuating user input device 18.

Figure 4:
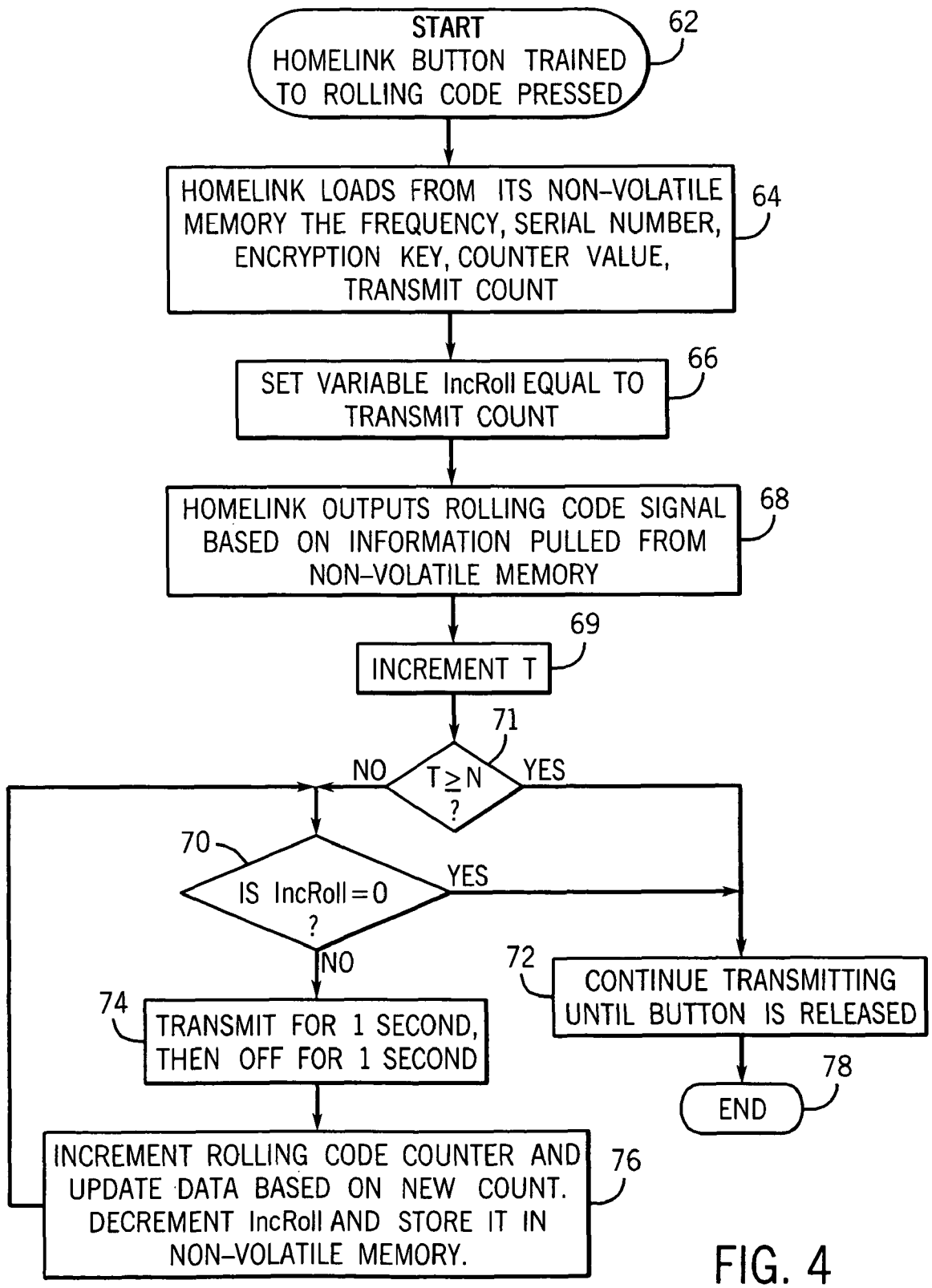
FIG. 4 is a flowchart of a transmit method, according to an exemplary embodiment.

Referring to FIG. 4, at a step 62, the button on trainable transmitter 30 trained to a rolling code-type receiver 12 is pressed. Trainable transmitter 30 is configured to load from non-volatile memory the frequency, serial number, encryption key, counter value (or rolling code count), and the transmit count value (or number of times to transmit). At step 66, a variable IncRoll is set equal to the transmit count value. At a step 68, trainable transmitter 30 is configured to send a rolling code signal comprising a transmitter identifier and an encrypted counter value to receiver 12. At a step 69, a value T is incremented, wherein T represents the number of times a button trained to a rolling code is pressed since training. This optional step, along with optional step 71 is configured to disable the sending of a plurality of sequential counter values after N transmissions. If T is greater than or equal to N at step 71, the process continues at step 72. If not, the process continues at step 70.

At a step 70, if the variable IncRoll is equal to 0, trainable transmitter 30 continues to transmit the same transmitter ID and encrypted counter value until the button of user input device 34 is released. If IncRoll is not equal to 0, trainable transmitter is configured to transmit the rolling code signal on for one second and then off for one second. The on/off duty cycle can be controlled to comply with Federal Communications Commission requirements. Other duty cycles or delays between transmissions can be used. At a step 76, counter value 26 (FIG. 2) is incremented at transmitter 30, IncRoll is decremented and stored in non-volatile memory, and the process returns to step 70. At this point the next sequential encrypted counter value is transmitted regardless of whether the button has been released. Steps 70, 74, and 76 continue until IncRoll equals 0, at which point transmission of the last in the sequence of encrypted counter values continues until a button is released and the process ends at step 78.

Receiver 12 is configured to synchronize with the counter value 26 of transmitter 30 by receiving at least two encrypted counter values in sequence. By synchronizing, receiver 12 stores the last received encrypted value transmitted by trainable transmitter 30.

According to one exemplary embodiment, at least two rolling code signals or messages are sent by trainable transmitter 30 during a training operation, i.e., during an operation in which a user is initially synchronizing, training, or programming their trainable transmitter 30 to receiver 12 or subsequently resynchronizing the transmitter 30 to receiver 12. Trainable transmitter 30 can be configured to send a sufficient number of different sequential counter values to synchronize receiver 12, or can be configured to send one additional sequential counter value to cause receiver 12 to synchronize and then activate remote system 14 to provide visual and/or audible feedback to the user that training was successful. The plurality of rolling code messages having different sequential counter values are sent in response to a single user input (e.g., a single button press which can be of short duration or sustained, a single voice command, etc.).

The single user input in the embodiment of FIG. 4 can be a button press of short duration (e.g., approximately one second or less) or of a more sustained duration (e.g., greater than one second), and either duration of button press will result in sending the at least two messages having sequential encrypted counter values. Alternative duration thresholds and configurations are contemplated.

According to one exemplary embodiment, transmitter 30 can be configured to send the plurality or at least two messages each of the first N times the single user input is actuated in operation, and thereafter to send only one rolling code message in response to a single user input. N can be set to 2, 5, 100, or any other number to ensure that trainable transmitter 30 can be easily trained by the user before entering an operating or normal mode.

Although the encrypted counter values are characterized as "sequential" herein, counter value 26 (FIG. 2) can be incremented by 1, 2, 3, or any other number of values predictable by receiver 12, so that receiver 12 can correspondingly maintain synchronization with each received rolling code message. The sequence may be linear (as discussed above) or may be non-linear. In some systems, a receiver may be configured to accept a value that is within a certain range (backwards or forwards) within the sequence in order to accept a valid training.

According to an exemplary embodiment, trainable transmitter 30 can identify the type of receiver 12 by analyzing the delay between multiple transmissions sent by original transmitter 10; by counting the number of bits in the message received for original transmitter 10, by learning a code or codes from original transmitter 10, or by other methods.

According to an alternative embodiment, receiver 12 can be configured to enter a training mode based on a signal sent from original transmitter 10 or trainable transmitter 30, without requiring a user to separately command receiver 12 to enter a training mode, such as by a button press. Such a system is illustrated in U.S. Published Application No. 20030033540.

As used herein, the phrase "each message" means that the associated transmitter can transmit a plurality of messages having the stated characteristics and does not mean that all messages sent by the transmitter must have these characteristics. For example, transmitters 10 and 30 can be configured to send different combinations of messages, words or data in different modes, at different times, or for different functions.

Although an exemplary embodiment is disclosed herein with reference to trainable transmitter 30 sending a plurality of messages in response to a single user input, original transmitter 10 or any other transmitter configured to be operable with receiver 12 can also be configured with part or all of the steps disclosed herein. In particular, original transmitter 10 can be configured to; in response to a single user input, transmit at least two sequential counter values to the receiver having the same transmitter identifier.

According to one exemplary embodiment, receiver 12 responds to receiving a first rolling code message (comprising transmitter ID 20 and encrypted counter value 22) during a training operation, stores the transmitter ID in non-volatile memory, and decrypts and stores the counter value in memory. Upon receipt of a second rolling code message having the same transmitter ID and the next sequential counter value, receiver 12 is synchronized.

According to alternative embodiments, other rolling-code based radio frequency systems can be used. For example, in some systems the transmitter identifier need not be sent with each transmission.

What is claimed is:

1. A device for coupling to a vehicle and for training to activate a remote system, comprising:
    a radio frequency transmitter having a training mode and an operational mode;
    wherein the radio frequency transmitter is configured to identify a rolling code encryption algorithm for use with the remote system from a plurality of rolling code encryption algorithms;
    wherein the radio frequency transmitter is further configured to synchronize a rolling code count of the remote system with a rolling code count of the radio transmitter during the training mode by transmitting, in response to a single user input, at least two messages having sequential encrypted rolling code values in accordance with the identified rolling code encryption algorithm;
    wherein the radio frequency transmitter is configured to transmit a next encrypted rolling code in the sequence with the first transmission of the operational mode.

2. The device of claim 1, wherein each of the at least two messages includes a transmitter identifier.

3. The device of claim 1, wherein the radio frequency transmitter is configured to enter the training mode in response to the single user input.

4. The device of claim 1, wherein the radio frequency transmitter is configured to send at least three messages having sequential encrypted rolling values in response to the single user input.

5. The device of claim 1, wherein the radio frequency transmitter is further configured to send the at least two messages each of the first N times the single user input is actuated, wherein N is at least two, and thereafter to send one of the messages having the next encrypted counter value in the sequence in response to a single user input.

6. The device of claim 1, wherein the radio frequency transmitter is configurable by a user to activate one or more of a plurality of different remote systems using different radio frequency messages.

7. The device of claim 6, wherein the radio frequency transmitter is configured to identify at least one of the plurality of different remote systems based on a radio frequency signal received from an original transmitter associated with the at least one remote system.

8. The device of claim 6, wherein the radio frequency transmitter is configured to identify at least one of the plurality of different remote systems based on a user input.

9. The device of claim 1, configured to control a garage door opener.

10. A method of providing a counter value and a transmitter identifier to a receiver configured to control a system, comprising:
    in a training mode, identifying a rolling code encryption algorithm for use with the receiver from a plurality of rolling code encryption algorithms;
    in the training mode, receiving a single user input;
    in response to the single user input, transmitting a plurality of sequential encrypted counter values, in accordance with the identified rolling code encryption algorithm, to the receiver; and
    in an operating mode, transmitting a next sequential encrypted counter value in response to a user input.

11. The method of claim 10, further comprising identifying the rolling code encryption algorithm for use with the receiver by determining the type of receiver.

12. The method of claim 11, wherein the type of receiver is determined based on a radio frequency signal received from an original transmitter associated with the receiver.

13. The radio frequency transmitter of claim 1, wherein the single user input is a button press.

14. The method of claim 11, further comprising commanding the receiver to enter a training mode by pressing a button on the receiver.

15. The method of claim 14, wherein, after the receiver is in the training mode, transmitting at least three sequential encrypted counter values to the receiver in response to the single user input.

16. The method of claim 10, wherein the plurality of sequential encrypted counter values causes the receiver to open a garage door.

17. A radio frequency remote control system, comprising:
    a receiver; and
    a transmitter integrated into a vehicle interior element and configured to identify a rolling code encryption algorithm for use with the receiver from a plurality of rolling code encryption algorithms and configured to send at least two sequential encrypted rolling code messages in response to one user input and in accordance with the identified rolling code encryption algorithm;
    wherein the receiver is configured to synchronize with the transmitter by decrypting the sequential encrypted rolling code messages and checking for whether the counters obtained by the decryptions are sequential according to the encryption and decryption algorithms used by the radio frequency remote control system.

18. The radio frequency remote control system of claim 17, wherein the receiver is configured to activate a garage door opener to move the garage door in response to the two sequential encrypted rolling code messages.

19. The radio frequency remote control system of claim 17, wherein the transmitter is configured to send the at least two sequential encrypted rolling code messages each of the first N times the user input is actuated, wherein N is at least two, and thereafter to send one of the messages having a next encrypted counter value in a sequence in response to a single user input.

20. The radio frequency remote control system of claim 17, wherein the transmitter is configurable by a user to activate one or more of a plurality of different receivers using different encryption algorithms and radio frequency messages.

* * * * *